US010504627B2

(12) United States Patent
Masdupuy et al.

(10) Patent No.: US 10,504,627 B2
(45) Date of Patent: Dec. 10, 2019

(54) METHOD FOR MANAGING STOPPAGE OF A PRESSURISED-WATER NUCLEAR REACTOR

(71) Applicant: DCNS, Paris (FR)

(72) Inventors: Jean Masdupuy, Le Pecq (FR); Fabien Puccetti, Angers (FR); Geoffrey Paul Etienne Haratyk, Dijon (FR); Vincent Gourmel, Paris (FR)

(73) Assignee: DCNS, Paris (FR)

( * ) Notice: Subject to any disclaimer, the term of this patent is extended or adjusted under 35 U.S.C. 154(b) by 126 days.

(21) Appl. No.: 15/536,078

(22) PCT Filed: Dec. 16, 2015

(86) PCT No.: PCT/EP2015/080103
§ 371 (c)(1),
(2) Date: Jun. 14, 2017

(87) PCT Pub. No.: WO2016/097061
PCT Pub. Date: Jun. 23, 2016

(65) Prior Publication Data
US 2018/0330835 A1 Nov. 15, 2018

(30) Foreign Application Priority Data

Dec. 17, 2014 (FR) .................................. 14 02889

(51) Int. Cl.
*G21C 15/18* (2006.01)
*G21D 3/06* (2006.01)
(Continued)

(52) U.S. Cl.
CPC ............. *G21C 15/18* (2013.01); *G21C 19/28* (2013.01); *G21D 1/006* (2013.01); *G21D 3/06* (2013.01); *G21D 3/001* (2013.01); *Y02E 30/40* (2013.01)

(58) Field of Classification Search
CPC ........ G21C 19/28; G21C 15/18; G21D 1/006; G21D 3/06; F22B 37/421
See application file for complete search history.

(56) References Cited

U.S. PATENT DOCUMENTS 4,302,291 A    11/1981 Severs
4,666,662 A  *  5/1987 Loose .................... G21C 15/18
                                                                    376/211
(Continued)

FOREIGN PATENT DOCUMENTS

CN    101719386 A    6/2010
FR    2 951 008 A1   4/2011
(Continued)

OTHER PUBLICATIONS

FR Search Report, dated Oct. 6, 2015, from corresponding FR application No. 14 02889.
(Continued)

*Primary Examiner* — Sharon M Davis
(74) *Attorney, Agent, or Firm* — Young & Thompson

(57) ABSTRACT

Disclosed is a method for managing stoppage of a pressurized-water nuclear reactor integrated into a submerged module for producing electrical power, in case of detection of a primary/secondary leak in a steam generator equipped with a safety valve, which generator is connected to the reactor and associated with a standby cooling unit. The method includes: detecting a primary/secondary leak in the steam generator; automatically stopping the reactor and isolating the broken steam generator; bringing the corresponding standby cooling unit online; monitoring the primary pressure and, once the primary pressure has passed below the set pressure of the safety valves of the steam generators, isolating the standby cooling unit of the broken steam genera-
(Continued)

tor; and continuing to passively cool the reactor with the remaining steam generators and cooling unit.

5 Claims, 3 Drawing Sheets

(51) Int. Cl.
*G21C 19/28* (2006.01)
*G21D 1/00* (2006.01)
*G21D 3/00* (2006.01)

(56) References Cited

U.S. PATENT DOCUMENTS

| | | |
|---|---|---|
| 5,247,553 A | 9/1993 | Herring |
| 5,309,487 A | 5/1994 | McDermott et al. |
| 2012/0328069 A1 | 12/2012 | Kolmayer et al. |
| 2013/0020808 A1 | 1/2013 | Kolmayer et al. |
| 2013/0301782 A1* | 11/2013 | Malloy, III ............ G21C 15/18 376/282 |

FOREIGN PATENT DOCUMENTS

| | | |
|---|---|---|
| FR | 2 951 009 A1 | 4/2011 |
| FR | 2 951 010 A1 | 4/2011 |
| FR | 2 951 011 A1 | 4/2011 |
| FR | 2 951 012 A1 | 4/2011 |
| FR | 2 958 782 A1 | 10/2011 |
| FR | 2 958 783 A1 | 10/2011 |
| FR | 2 958 784 A1 | 10/2011 |
| JP | 05-100075 A | 4/1993 |

OTHER PUBLICATIONS

International Search Report, dated Mar. 10, 2016, from corresponding PCT application No. PCT/EP2015/080103.

* cited by examiner

METHOD FOR MANAGING STOPPAGE OF A PRESSURISED-WATER NUCLEAR REACTOR

BACKGROUND OF THE INVENTION

Field of the Invention

The present invention relates to a method for managing stoppage of a pressurized-water nuclear reactor, integrated into a submerged module for producing electrical power, if a primary and/or secondary leak is detected.

Description of the Related Art

Such submerged modules for producing electric power are already known in the state of the art.

Reference may for example be made to documents U.S. Pat. No. 5,247,553, JP 50 018 891 and U.S. Pat. No. 4,302,291.

These various documents in fact describe underwater or submerged modules for producing electrical power in which means for producing electrical power can be integrated that are associated with means forming a nuclear boiler, for example.

It is known that such structures have a certain number of advantages, since nuclear energy is an effective and profitable answer to energy and ecological problems.

Such structures also make it possible to resolve a certain number of problems, in particular regarding safety and accounting for risks, whether natural, such as tsunamis, hurricanes or the like, or human, such as airplane crashes or malicious act.

It is also known that for the moment, these various projects have not resulted in industrial exploitation.

Efforts to improve this type of structure have been made by the applicant for many years.

These efforts have already for example resulted in the filing of many patent applications to which reference may be made, and in particular documents FR 2,951,008, FR 2,951,009 and FR 2,951,010, FR 2,951,011, FR 2,951,012 and FR 2,958,782, FR 2,958,783 and FR 2,958,784.

Several of these documents in particular deal with the operating safety of this type of module, and in particular the safety thereof in case major incidents, as have recently occurred in land-based plants.

These efforts, brought together in a project known as FLEXBLUE (trademark registered by the applicant), aim to revolutionize nuclear safety by offering an unparalleled level of safety.

The philosophy behind this safety is based on the use of a cold source that is infinitely available and the use of passive safeguards systems.

These then make it possible for the reactor to deal autonomously, within the meaning of category D of the AIEA, i.e., without a power supply other than that of the batteries of the control/command system or action by an outside operator, with any accident for several weeks, versus 72 hours in the plants being built.

The passive safeguards systems of the FLEXBLUE system guarantees, in the event of a primary/secondary leak on a steam generator, safeguarding of the reactor and compliance with safety criteria (i.e., no discharge to the outside, no dewatering of the core, no deterioration of the confinement enclosure, etc.).

However, this is done at the expense of significant industrial damage, for example complete flooding of the confinement enclosure with the contaminated primary fluid, this damage needing to be avoided.

The present application then proposes to resolve two technical problems, namely:
 how to detect a primary/secondary leak on a pressurized water reactor and how to identify the faulty steam generator,
 how to eliminate this leak without operator action or outside power supply within a pressurized-water reactor with passive safety, without using ultimate safeguard systems involving the rapid depressurization of the primary circuit by opening the confinement enclosure or any other intermediate container in order to minimize the contamination of the premises, and without discharge into the environment.

The principle underlying the design of a pressurized-water reactor PWR is the separation of the primary fluid in contact with the nuclear fuel and the secondary fluid that transmits the energy derived from the nuclear reaction to a turbine outside the confinement enclosure.

Consequently, these two primary and secondary circuits only share a limited number of exchangers, i.e., the steam generators, within which the water from the primary circuit transmits the energy derived from the reaction to the secondary circuit by causing the fluid to boil.

In order to increase the ability to discharge the power of the primary fluid, the latter must be kept in liquid state.

To that end, this circuit is subject to a very high pressure, around 15 MPa, which greatly exceeds that of the secondary circuit, which is around 7 MPa.

Consequently, a leak on one of the steam generators unfailingly leads to:
 a spill of primary fluid into the secondary circuit as long as the pressures between the circuits are not balanced, and
 a bypass of the confinement barriers, with the understanding that the contaminated primary fluid outside its circuit (second barrier) and the secondary circuit leaves the confinement enclosure (third barrier), which can cause substantial discharges into the environment.

Such failures are not hypothetical (estimated likelihood of about $10^{-3}$ per reactor year), and there is considerable precedent with pressurized-water reactors in use throughout the world (five major accidents in one particular fleet in use, some of which caused significant discharges of several tens of cubic meters of contaminated water).

It should be noted that the majority of pressurized-water reactors currently in use throughout the world have acceptable functional leaks between the primary and secondary circuits, namely around several liters per hour.

Today, there is no automated system for detecting primary/secondary leaks that does not use confirmation of the diagnosis by an operator.

The general principle allowed by power plant operators for detecting primary/secondary leaks is based on:
 the presence of activity due to nitrogen 16 in the main steam lines of the secondary circuit, greatly exceeding that due to functional leaks alone (N-16: a particularly discriminating radionuclide taking into account the short-term contamination of the secondary circuit by the primary circuit),
 the confirmation of the suspected primary/secondary leaks through a primary and secondary water balance done by the operator.

Conversely, without this diagnostic done by an operator, the control/command system of the pressurized-water reactors in use automatically manages this accident as an outside primary leak (most general case) once a sufficient mass of primary fluid has been transferred to the secondary.

Such management of the leak does not account for the bypass of the confinement by the steam generators and leads to significant discharges, since the cooling capacities using the secondary circuit, as well as the safety injection circuits of the primary circuit that then also feed the leak, are then massively used.

Nuclear safety lies in the fact that the design of the reactors must make it possible to continuously ensure:
the confinement of radioactive materials,
the discharge of the power derived from the nuclear fuel,
control of the reactivity of the core.

Compliance with the third criterion above is affected little or not at all by a primary/secondary leak.

Conversely, the first two are greatly affected, and maintaining these objectives in the presence of a primary/secondary leak often leads to antagonistic actions.

Indeed, the discharge of the power derived from the nuclear reaction goes through the use of the secondary circuit, most often using discharge valves into the atmosphere, directly sending the steam produced by the contaminated generator into the atmosphere, which generates a substantial radionuclide discharge and violates the first criterion.

Conversely, isolating the steam generator experiencing the primary/secondary leak will lead to a pressure increase of the latter (through lack of power discharge by the primary fluid) and filling with the contaminated primary fluid.

This will have two major effects:
a loss of power discharge capacity, which violates the second criterion,
the opening of the secondary overpressure valve, leading to greater discharges than in the preceding case, since this will no longer involve contaminated steam, but liquid water, which is a much more effective activity vector, which violates the first criterion.

Managing breaks in steam generator tubes is therefore a delicate task.

It typically involves a series of actions by the operator first choosing to favor the first criterion over the second, then definitively confining the radioactive materials once it is possible to discharge the power produced by the core without using the damaged secondary circuit.

On a traditional pressurized water reactor such as an EPR, managing a break of a steam generator tube, as set out by most reactor vendors, is done as follows:

The detection of the damage is done either by the operator, who assumes a steam generator tube break, or by the control/command system, which detects a primary leak.

In both cases, this leads to the following reactions:
the automatic stoppage of the reactor and the isolation of the steam generators of the secondary circuit,
the triggering of the safety injection systems, the goal of which is to fill the primary circuit with water to guarantee flooding of the core despite the leak. In the present case, this also results in maintaining the leak and causing the damaged generator to fill,
triggering systems to discharge the residual power by the secondary. After the stoppage, the core of the reactor continues to generate power due to the decrease in radioactivity of the fission products. To discharge it and avoid heating, then melting of the core, all of the atmosphere discharge valves of the steam generators open and discharge the steam into the atmosphere (including that contaminated by the primary leak).

The steam generators are refilled with liquid water by a so-called ASG system, which, in the case of the damaged steam generator, contributes to filling it with liquid water.

Once the primary/secondary leak is confirmed and the damaged steam generator is identified, for example by the operator, it is isolated.

However, it continues to fill through the action of the safety injection, which keeps the primary circuit under pressure.

The primary circuit is then cooled by the other steam generators.

The objective is then to stop the safety injection as quickly as possible in order to stop maintaining the leak and avoid filling the damaged generator and opening its overpressure valve.

However, this is only possible after the primary has been cooled enough to ensure that it will not enter the steam phase after the stoppage of a so-called ISMP pump that sees to its pressurization.

Among the known commercially available pressurized-water reactors, there is one for which this general method has been amended and adapted to passive safeguard systems.

The description of this safeguard strategy is in fact provided in document U.S. Pat. No. 5,309,487.

According to this strategy and as before, the damage is detected and managed by the control/command system as a primary leak.

There is then, as previously described:
automatic stoppage of the reactor and isolation of the steam generators,
triggering of the systems to discharge the power by the secondary.

All of the atmosphere discharge valves, called ADV, of the steam generators open and discharge the steam into the atmosphere, including that contaminated by the primary leak.

The steam generators are refilled with liquid water by the ASG system.

However, this reactor differs by the use of a passive safety injection system.

Instead of implementing ISMP pumps like on the EPR, a compensating reservoir is connected on the primary circuit and results in replacing the hot water from the primary circuit, or even steam, with cold water by natural circulation.

Added to this is also a normal volumetric control system of the primary circuit that tries to offset the leak by injecting water into the primary circuit.

This results in maintaining the leak and causing the damaged generator to fill with steam.

To avoid this pitfall, automated stoppages of this device are provided in the aforementioned U.S. document, if one of the steam generators reaches a very high water level.

The design of this reactor is close to that proposed in the FLEXBLUE project.

This in particular resolves certain problems also encountered in traditional pressurized water reactors in managing this type of damage, and in particular:
the choice of the ISMP active safety injection stoppage moment,
filling by the active systems of the damaged steam generator.

However, this design does not provide all the answers, in particular for the following reasons:
the sequence proposed in this prior US document is only automated during the first minutes of the damage. An operator must in fact intervene quickly to identify the damaged steam generator and isolate its atmosphere discharge valve in order to limit radioactive discharge. The latter must then cool the primary circuit via the passive systems.

the proposed sequence sets out the use of a system open to the atmosphere to discharge the residual power. This design choice creates discharge, which is prohibited by this project. However, it makes it possible to mitigate the leak by extremely fast cooling (and therefore depressurization) of the primary circuit.

BRIEF SUMMARY OF THE INVENTION

The invention proposes to provide answers to the questions previously asked by taking advantage of the use of standby cooling means, such as standby condensers.

In particular, this makes it possible to implement a passive system for discharging power in a closed circuit by the secondary circuit, this solution replacing discharges outside the enclosure in the case of a primary/secondary leak.

To that end, the present invention relates to a method for managing stoppage of a pressurized-water nuclear reactor, integrated into a submerged module for producing electrical power, if a primary and/or secondary leak is detected in a steam generator provided with a safety valve, said generator being connected to the reactor and associated with a standby cooling means, characterized in that it includes the following steps:
1) detecting a primary/secondary leak of the steam generator,
2) automatically stopping the reactor and isolating the damaged steam generators,
3) bringing the corresponding standby cooling means online,
4) monitoring the primary pressure,
5) once the primary pressure has passed below the set pressure of the safety valves of the steam generator, isolating the standby cooling means of the broken steam generator, and
6) continuing to passively cool the reactor with the remaining steam generators and cooling means.

According to other features of the method according to the invention, considered alone or in combination:
the detection of a primary/secondary leak is done by detecting one or several of the following phenomena:
1) increased activity of the secondary circuit due to contamination by the primary fluid,
2) increased secondary water inventory,
3) decreased primary water inventory;
the isolation of the standby cooling means of the broken steam generator is obtained by triggering a controlled valve inserted between them;
the controlled valve is associated with a compressed air supply.

BRIEF DESCRIPTION OF THE DRAWINGS

The invention will be better understood upon reading the following description, provided solely as an example and done in reference to the appended drawings, in which.

DETAILED DESCRIPTION OF THE PREFERRED EMBODIMENTS

Figure 1:
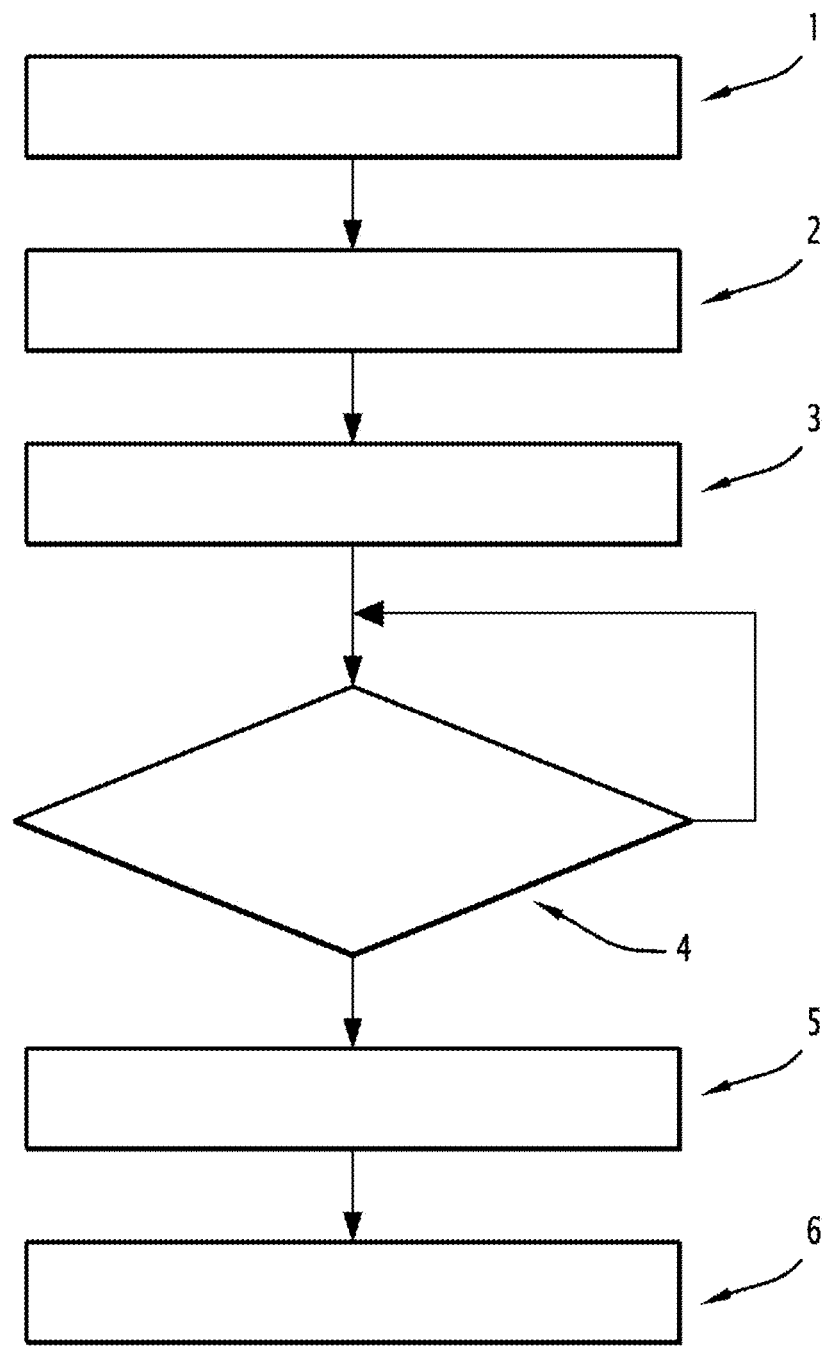
FIG. 1 is a flowchart illustrating the different steps of a method according to the invention.

The fundamental issue in managing a primary/secondary leak on a pressurized-water reactor with passive and automated safety with no atmospheric discharge lies in detecting the damage and obtaining a compromise between cooling and mitigation of the leak.

The solution proposed in the present application therefore consists of:
a primary/secondary leak detection logic using the conjunction of several signals respectively based on an increase in the N-16 activity of the secondary circuit, an inconsistency in the regulation of the supply water maintaining the level of the steam generator, an inconsistency of the regulation of the primary volumetric control ensuring maintenance of the primary water inventory,
an automation stopping cooling by the damaged steam generator.

A primary/secondary leak is characterized by:
increased activity of the secondary circuit due to contamination by the primary fluid,
increased secondary water inventory,
decreased primary water inventory.

In the present application, we propose to detect this leak from one or several of these phenomena.

Indeed, one could settle for detecting nitrogen 16, which could suffice in itself, but in the case of the present application, we for example choose to consider that there is a primary/secondary leak in the case of a simultaneous presence of all three of the previously indicated criteria, in order to guarantee the absence of untimely detection.

It should in fact be recalled that in the case of the present FLEXBLUE project, a non-detection of the leak does not call the nuclear safety into question, but leads to significant deterioration of the industrial tool, this being the problem that the present application proposes to resolve.

The first criterion above, i.e., the increased activity of the secondary circuit, is detectable by using nitrogen 16 detection systems, placed on the primary steam lines of the reactor.

These detection system includes sensors that must be associated with a triggering threshold that is variable based on the power extracted by the reactor making it possible to distinguish an increase in activity due to functional and consecutive leaks and an increase in power of the core, from an actual primary/secondary leak.

The second criterion is detectable via an inconsistency on the system for regulating the level of the steam generator.

Indeed, this system is based on the conjunction of two input values, i.e., the power extracted by the turbine with which a tabulated steam flow rate is associated and the reading of the level of steam generator.

From these data, the regulating system injects the liquid supply water flow rate (ARE) necessary to keep the level of the steam generator constant.

Thus, the unexpected increase in the secondary water inventory will be detectable by a difference between the expected supply water flow rate for the supplied power and the supply flow rate actually injected to keep the level of the steam generator constant.

The last criterion is detectable via an inconsistency on the volumetric regulating system of the primary circuit.

If the latter must inject a large quantity of water to keep the level of the pressurizer at a constant primary pressure and temperature, there is an unidentified loss of primary inventory.

The objective of the proposed automation is therefore to find a compromise between:
  ensuring maximum power discharge and rapid cooling of the primary while using all of the standby condensers (or other cooling means), and
  the need to isolate the cooling of the damaged generator quickly so as not to feed the leak and to limit the loss of primary inventory.

All of this is of course done while keeping a completely passive action mode, like all of the standby systems of the project in progress, i.e., according to category D of the reference classification established by the AIEA.

To that end, the applicant has conducted simulations, and various phenomena have been observed.

Indeed, if the standby cooling means of the damaged steam generator are stopped too soon, there is an increase in the pressure and the water level in this steam generator, causing the overpressure valves of this steam generator to open and leading to contamination of part of the confinement enclosure.

If the standby cooling means of the damaged steam generator are stopped too late, there is an excessive loss of primary inventory, causing automatic depressurization and flooding of the confinement enclosure.

The invention proposes to carry out the method as illustrated in FIG. 1, which leads to ensuring the safety of the assembly when stopped.

In this case, it is of course necessary to refer to the various documents filed by the applicant on the FLEXBLUE project to obtain a complete description of the reactor.

The described method leads to stopping the standby cooling means of the damaged generator by basing itself on an indication reflecting the energy inventory of the primary circuit so as to be sure that the power to be discharged at the primary, which can only decrease, does not cause valves to open.

To that end, the method illustrated in FIG. 1 is implemented.

This method can be summarized as follows:

If a primary/secondary leak has been detected, the standby cooling of the damaged steam generator is isolated once the thermohydraulic conditions of the boiler prove that there is no longer any risk of opening valves of this steam generator if its cooling is interrupted.

In the case described in the present application, one decides to isolate the standby condenser of the damaged steam generator if the primary pressure falls below a value lower than the set value of the protection valves of the steam generator.

Indeed, the method illustrated in FIG. 1 then includes a step 1 for detecting a primary/secondary leak that, in step 2, triggers an automatic stoppage of the reactor and an isolation of the steam generator.

In step 3, the standby condensers are brought online, and in step 4, the primary pressure is read so that it is compared to the set pressure of the valves of the steam generators.

When the latter, i.e., the primary pressure, becomes lower than the set pressure of the valves, the isolation of the standby condenser of the damaged steam generator is triggered in step 5, then in step 6, the passive cooling of the reactor continues on the remaining exchangers.

Figure 2:
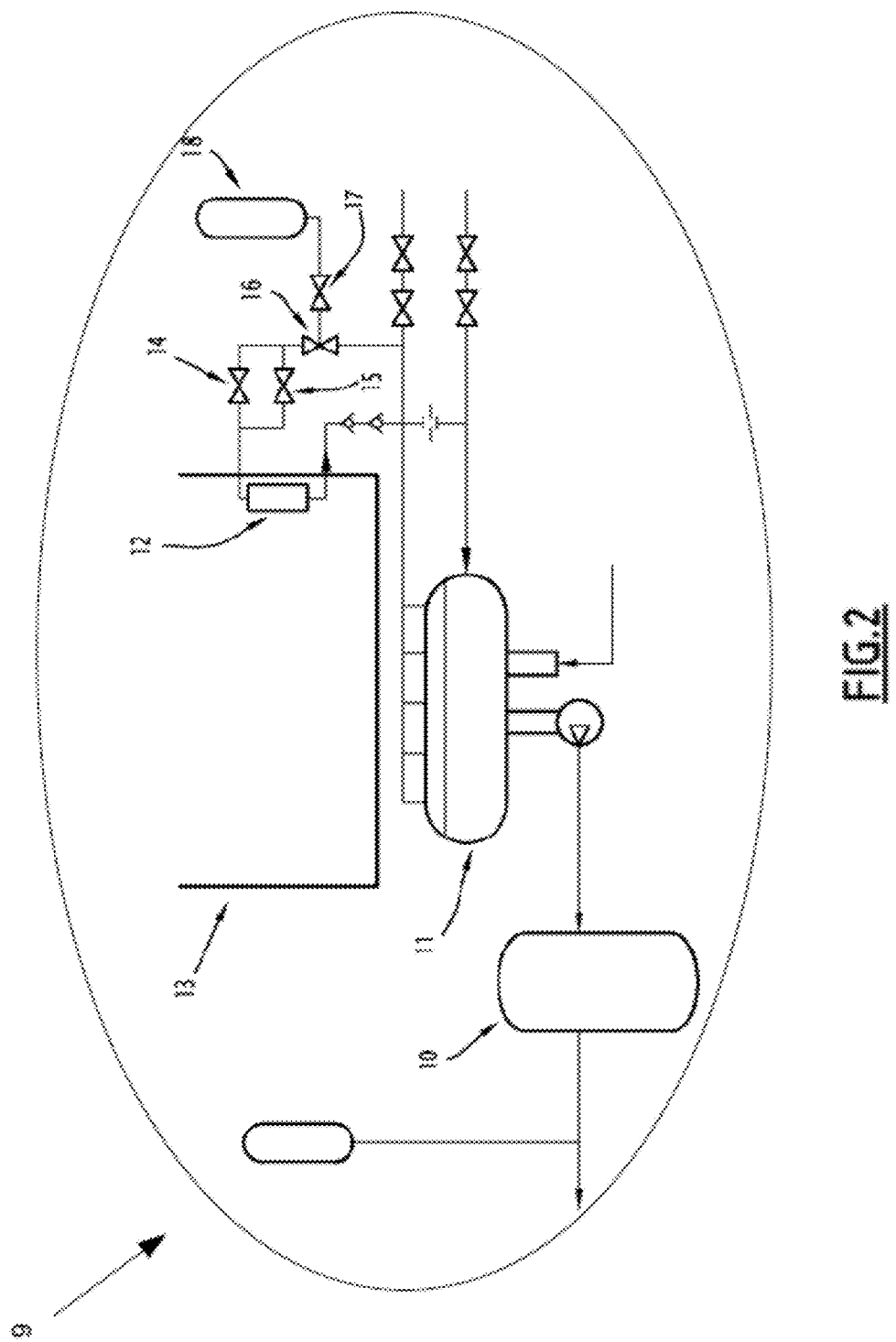
FIG. 2 is a block diagram illustrating part of a pressurized water reactor.

The implementation of this method can be illustrated by the means described in FIG. 2.

To provide a simplified description of what has already been developed by the applicant, we will simply note that this FIG. 2 shows a submerged module 9, a pressurized-water reactor vessel designated by general reference 10, a steam generator designated by general reference 11 and a standby condenser designated by general reference 12, for example in contact with an endless cold source 13, such as the ocean or the like, as described in the various documents relative to the FLEXBLUE project.

For safety reasons, valves 14 and 15 used to bring the standby condensers, like the condenser 12, online, are lined and are of the type that is normally open such that a loss of logistic support of the module automatically causes the commissioning of the standby condensers.

The sequence proposed in the present application must counter this phenomenon.

Thus, an isolating valve designated by general reference 16 is provided in this connecting line to the standby condenser, to isolate the latter under the action of a control valve designated by general reference 17, connected to a compressed air source 18, for example.

Thus, when regulating air is lost following the loss of electrical power supplies following the stoppage of the reactor, the standby condenser 12 is isolated by the valve 16 placed downstream, supplied via the dedicated air supply 18 and for example positioned by a valve 17 of the pyrotechnic type or any other device having the same qualities, i.e., an extremely low call failure rate, and very energy-efficient maneuvering and maintenance in position.

Of course, different technical solutions to the problem of automatically isolating the secondary cooling can be considered.

It is also possible to consider an entire series of alternatives on two specific technical points of the described elements, i.e., the logics associated with the three detection criteria to trigger the automations and the thermohydraulic criteria used to quantify the minimal primary energy loss before isolating the standby condenser from the damaged steam generator.

Lastly, it is possible to consider applying the same isolating logics of the standby cooling systems on active safety reactors.

The sequence can be simpler, with the understanding that this is limited to permanent isolation of the atmosphere discharge valve of the damaged generator once the primary thermohydraulic conditions allow it (i.e., a low enough residual power, a primary pressure lower than the set pressure of the protection valves of the steam generator, etc.).

Figure 3:
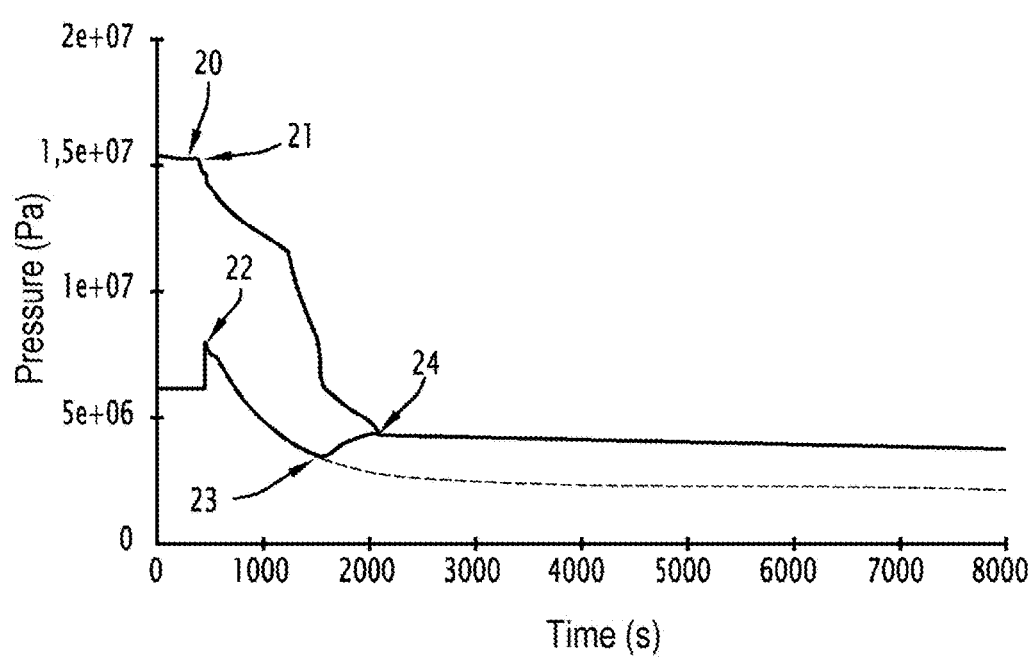
FIG. 3 shows a graph illustrating the mitigation of the primary/secondary leak.

FIG. 3 for example shows a simulation of the operation of the entire mitigation sequence in the context of the project.

The computing code used is the ATHLET code, which is a thermohydraulic simulation tool used in nuclear accident studies and recognized by international safety authorities.

The obtained results show the operation covering the entire range of primary/secondary leaks commonly required during a safety demonstration.

For a guillotine-type break of a steam generator tube, the results shown in FIG. 3 are obtained, reflecting quick management of the damage no longer using only passive systems after the detection and not causing unacceptable or irreversible damage to the industrial tool.

In this FIG. 3, the beginning of the leak is designated by reference 20, the detection of the damage by reference 21 causing the automatic stoppage of the reactor and the supply of steam to the turbine.

Reference 22 shows the startup of the standby condensers, and 23 shows the stoppage of the standby condenser of the damaged steam generator.

Reference 24 shows the primary/secondary equilibrium achieved when the leak is eliminated, the reactor next cooling slowly by its passive means.

These curves are established from the primary pressure, the pressure of a first healthy steam generator and a second steam generator affected by the leak.

Of course, this model is simplified, in particular in terms of the pressure and steam generator level regulations.

However, it provides a good overview of the obtained results.

This also makes it possible to increase and improve the arguments put forth regarding the intrinsic and passive safety of nuclear reactors, as defined by the applicant.

Of course, still other embodiments can be considered.

In particular, the invention could of course be suitable for a pressurized-water reactor integrated into a land module.

The invention claimed is:

1. A method for managing stoppage of a submerged pressurized-water nuclear reactor of a module configured to produce electrical power, the module having a plurality of steam generators each being provided with a safety valve and associated with a standby condenser, the method comprising:
   detecting a primary/secondary leak of primary fluid into secondary fluid of one of the steam generators;
   automatically stopping the reactor and isolating the steam generator suffering from the primary/secondary leak;
   bringing the standby condensers online;
   monitoring a primary pressure of the primary fluid;
   determining that the primary pressure is below the set pressure of the safety valve of the steam generator, then isolating the standby condenser of the steam generator suffering from the primary/secondary leak by preventing the primary fluid from being supplied to the standby condenser; and
   continuing to passively cool the reactor with remaining steam generators of the plurality of steam generators and condensers.

2. The method for managing stoppage of the submerged pressurized-water nuclear reactor according to claim 1, wherein the detection of the primary/secondary leak is done by detecting one or several of the following phenomena:
   increased activity due to contamination by the primary fluid into the secondary fluid,
   increased secondary water inventory, and
   decreased primary water inventory.

3. The method for managing stoppage of the submerged pressurized-water nuclear reactor according to claim 1, wherein the isolation of the standby condenser of the steam generator suffering from the primary/secondary leak is obtained by triggering a controlled valve inserted between the standby condenser and the steam generator suffering from the primary/secondary leak.

4. The method for managing stoppage of the submerged pressurized-water nuclear reactor according to claim 3, wherein the controlled valve is associated with a compressed air supply.

5. The method for managing stoppage of the submerged pressurized-water nuclear reactor according to claim 2, wherein the isolation of the standby condenser of the steam generator suffering from the primary/secondary leak is obtained by triggering a controlled valve inserted between the standby condenser and the steam generator suffering from the primary/secondary leak.

* * * * *